United States Patent
Chen et al.

(10) Patent No.: US 12,065,130 B2
(45) Date of Patent: Aug. 20, 2024

(54) PARKING ASSISTANCE SYSTEM FOR AUTOMATED PULLING-OUT OF A LONGITUDINAL PARKING SPACE WITH A REVERSING MOVE AS THE LAST PULLING-OUT MOVE

(71) Applicant: Bayerische Motoren Werke Aktiengesellschaft, Munich (DE)

(72) Inventors: Sofie Chen, Munich (DE); Felix Gutsch, Munich (DE); Ramy Nagi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 154 days.

(21) Appl. No.: 17/253,955

(22) PCT Filed: May 24, 2019

(86) PCT No.: PCT/DE2019/100459
§ 371 (c)(1),
(2) Date: Dec. 18, 2020

(87) PCT Pub. No.: WO2019/242796
PCT Pub. Date: Dec. 26, 2019

(65) Prior Publication Data
US 2021/0269019 A1 Sep. 2, 2021

(30) Foreign Application Priority Data
Jun. 19, 2018 (DE) ...................... 10 2018 209 865.4

(51) Int. Cl.
*B60W 30/06* (2006.01)
*B60W 30/18* (2012.01)

(52) U.S. Cl.
CPC ...... *B60W 30/06* (2013.01); *B60W 30/18036* (2013.01); *B60W 2520/06* (2013.01); *B60W 2710/18* (2013.01); *B60W 2710/202* (2013.01)

(58) Field of Classification Search
CPC .......... B60W 30/06; B60W 30/18036; B60W 2520/06; B60W 2710/18; B60W 2710/202; B62D 15/0285
See application file for complete search history.

(56) References Cited

U.S. PATENT DOCUMENTS 9,085,321 B2 * 7/2015 Noh ................... B62D 15/0285
9,481,368 B2 * 11/2016 Tomozawa ............ B60W 30/06
(Continued)

FOREIGN PATENT DOCUMENTS

CN 101980916 A 2/2011
CN 103079935 A 5/2013
(Continued)

OTHER PUBLICATIONS

Noh Tae Bong, KR20120032198A_Machine Translation, 2012 (Year: 2012).*

(Continued)

*Primary Examiner* — Jelani A Smith
*Assistant Examiner* — Alyssa Rorie
(74) *Attorney, Agent, or Firm* — Crowell & Moring LLP (57) ABSTRACT

A parking assistance system is provided for a motor vehicle for automated pulling-out with at least automated lateral control out of a longitudinal parking space. The automated pulling-out process comprises a plurality of pulling-out moves. The parking assistance system is designed to carry out, in an automated manner, a substantially linear reversing move as the last move of the automated pulling-out process before transferring control to the driver. The parking assistance system subsequently transfers control to the driver.

16 Claims, 6 Drawing Sheets

(56) References Cited

U.S. PATENT DOCUMENTS

| | | | |
|---|---|---|---|
| 9,925,978 B2* | 3/2018 | Tseng | B60W 10/04 |
| 10,836,432 B2* | 11/2020 | Hasejima | G08G 1/16 |
| 10,843,731 B2* | 11/2020 | Iwami | B60W 40/02 |
| 2011/0054739 A1 | 3/2011 | Bammert et al. | |
| 2013/0073119 A1 | 3/2013 | Hueger et al. | |
| 2014/0188339 A1* | 7/2014 | Moon | B62D 15/0285 701/41 |
| 2016/0075374 A1* | 3/2016 | Yamashita | B62D 15/0285 701/41 |
| 2018/0061241 A1* | 3/2018 | Iwami | G08G 1/168 |
| 2019/0061818 A1* | 2/2019 | Hiei | F16H 63/40 |
| 2019/0096261 A1* | 3/2019 | Hayashi | B62D 15/029 |
| 2019/0344828 A1* | 11/2019 | Omori | B62D 15/0285 |
| 2021/0354686 A1 | 11/2021 | Pan et al. | |

FOREIGN PATENT DOCUMENTS

| | | | |
|---|---|---|---|
| CN | 103889825 A | 6/2014 | |
| CN | 107776570 A | 3/2018 | |
| DE | 10 2008 017 030 A1 | 10/2009 | |
| DE | 10 2008 025 219 A1 | 12/2009 | |
| DE | 102009046163 A1 * | 5/2011 | B62D 15/027 |
| KR | 20120032198 A * | 4/2012 | B60W 30/06 |
| KR | 20130028183 A * | 3/2013 | B60W 40/02 |
| KR | 1509967 B1 * | 4/2015 | |
| WO | WO 2009/121534 A1 | 10/2009 | |

OTHER PUBLICATIONS

Noh Tae Bong, KR20130028183A_Machine Translation, 2013 (Year: 2013).*

International Search Report (PCT/ISA/210) issued in PCT Application No. PCT/DE2019/100459 dated Oct. 30, 2019 with English translation (four (4) pages).

German-language Written Opinion (PCT/ISA/237) issued in PCT Application No. PCT/DE2019/100459 dated Oct. 30, 2019 (six (6) pages).

German-language Search Report issued in German Application No. 10 2018 209 865.4 dated Jan. 22, 2019 with partial English translation (13 pages).

Ahrens D., "Parkassistent mit Längs- und Querführung [parking assistant using longitudinal and lateral guiding]" Fifth Conference on Driver Assistance of The Technical University of Munich, 2012, Munich, Germany (10 pages).

Chinese-language Office Action issued in Chinese Application No. 201980040143.6 dated Jun. 21, 2022 with English translation (16 pages).

* cited by examiner

PARKING ASSISTANCE SYSTEM FOR AUTOMATED PULLING-OUT OF A LONGITUDINAL PARKING SPACE WITH A REVERSING MOVE AS THE LAST PULLING-OUT MOVE

BACKGROUND AND SUMMARY OF THE INVENTION

The present subject matter relates to a parking assistance system for a motor vehicle for automated pulling out using at least automated lateral guiding out of a longitudinal parking space. Furthermore, the present subject matter relates to a method for pulling out of a longitudinal parking space.

In parking assistance systems using automated lateral guiding, the steering of the motor vehicle is taken over by the system during the parking process. The driver has to take over the longitudinal guiding himself by appropriate acceleration and braking. In parking assistance systems using automated lateral guiding and automated longitudinal guiding, the task of the longitudinal guiding is also partially or completely taken over by the parking assistance system depending on the degree of automation. In parking assistance systems using automated lateral guiding and automated longitudinal guiding, in general the steering, the braking, the vehicle drive, and the travel direction (forward or reverse travel) are controlled by the parking assistance system. In such parking assistance systems, the driver has the option, for example, by actuating an operating element in the vehicle cockpit, for example, a button, of parking the vehicle automatically; it can be provided that the operating element still has to be actuated during the parking maneuver. It would also be conceivable that the parking assistance system is remote controlled via remote control from outside the vehicle and no driver is in the vehicle during the parking maneuver.

One example parking assistance system using automated lateral and longitudinal guiding is described in the document "Parkassistent mit Längs-und Querführung [parking assistant using longitudinal and lateral guiding]," Dirk Ahrens, 5$^{th}$ Conference on Driver Assistance of the Technical University of Munich, Munich, 2012."

Parking assistance systems normally comprise a parking function for automated parking in longitudinal parking spaces and/or transverse parking spaces, optionally a pulling-out function for automated pulling out can also be provided.

Known parking assistance systems generally assist the parking in reverse longitudinally in relation to the roadway in a longitudinal parking space located in parallel to the roadway, wherein the vehicle parks in the longitudinal parking space in reverse using automated lateral guiding and possibly automated longitudinal guiding in one or more moves along a calculated parking trajectory.

It is furthermore known that parking assistance systems also assist the pulling out from a longitudinal parking space using automated lateral guiding and possibly automated longitudinal guiding. In this case, the vehicle is maneuvered out of a longitudinal parking space using automated lateral guiding and preferably also automated longitudinal guiding and the vehicle is transferred to the driver at the end. If only automated lateral guiding is provided, the driver carries out the longitudinal guiding manually, wherein the driver switches the travel direction accordingly upon corresponding specification by the parking assistance system.

During the pulling-out maneuver, for example, the vehicle is first guided in reverse in parallel to the roadway boundary in a first reversing move, then guided forward with steering angle toward the pulling-out side in the forward direction, and then, if necessary, guided in reverse with steering angle against the pulling-out side in a reversing move. If necessary, one or more forward moves with steering angle toward the pulling-out side or reversing moves with steering angle against the pulling-out side can then be carried out.

It is to be noted that the first move does not necessarily have to be a linear reversing move: preferably (in dependence on the distances to the front boundary vehicle and to the rear boundary vehicle) it is decided whether the first move is a linear reversing move or a steered forward move. A steered-forward move as the first move is reasonable if, for example, before beginning the parking maneuver, there is a very small distance to the rear vehicle, while there is a greater distance to the front vehicle.

A transfer of control to the driver after the end of the pulling-out maneuver takes place, for example, when the vehicle can move past the front boundary objects without collision while maintaining a predetermined safety distance. Depending on the course of the maneuvering, it can occur that the transfer takes place when the vehicle already protrudes well out of the parking space with the front, for example, if the transfer takes place at the end of a forward move.

Since the transfer of control to the driver and the taking over by the driver typically requires a certain amount of time, the vehicle obstructs the following traffic on the roadway if the vehicle already protrudes well into the roadway in the transfer position.

It is the object of the present subject matter to specify parking assistance systems for pulling out and corresponding methods for pulling out which remedy this disadvantage.

The object is achieved by the features of the independent claims. Advantageous embodiments are described in the dependent claims. It is to be noted that additional features of a claim dependent on an independent claim can form a separate invention independent of the combination of all features of the independent claim without the features of the independent claim or only in combination with a subset of the features of the independent claim, which separate invention can be made the subject matter of an independent claim, a divisional application, or a subsequent application. This applies similarly to technical teachings described in the description, which can form an invention independent of the features of the independent claims.

A first aspect of the application relates to a parking assistance system for a motor vehicle, for example for a passenger vehicle, for automated pulling out using at least automated lateral guiding out of a longitudinal parking space. The longitudinal guiding including switching of the travel direction via an automatic transmission is preferably also taken over by the parking assistance system during the pulling-out process. However, it would also be conceivable that the parking assistance system carries out the steering during the pulling-out maneuver and the driver manually accelerates and brakes the vehicle upon instruction of the assistance system and also switches the travel direction by actuating a gear selector operating element, in particular in the case of a motor vehicle having manual shift transmission.

According to one preferred embodiment, the automated pulling-out maneuver is triggered by the driver via an operating action in the cockpit, wherein the driver is located on the driver seat in the vehicle during the automated parking maneuver. It would also be conceivable, however, that the parking assistance system is remote controlled via remote control from outside the vehicle and no driver is in the vehicle during the parking maneuver.

The parking assistance system is preferably also used for parking in a longitudinal parking space. However, this is not required. It would be conceivable that the parking assistance system can only be used for pulling out.

If the parking assistance system is also used for parking, it can be provided that it is only possible to pull out from a parking space if parking in this parking space was also already automatically performed via the parking assistance system. However, this is not required.

The automated pulling-out process comprises multiple pulling-out moves.

During the pulling-out maneuver, the vehicle is, for example, firstly reversed in parallel to the roadway boundary in a first reversing move, then guided forward in the forward direction with steering angle toward the pulling-out side.

The parking assistance system is designed to carry out various activities described hereinafter. This is typically performed by means of an electronic control unit, which can also be distributed over multiple controllers. The control unit can comprise one or more processors, which operate in a manner according to the present subject matter controlled via one or more software programs.

The parking assistance system is designed to automatically carry out an essentially linear reversing move as the last move of the automated pulling-out process before the transfer of control to the driver (depending on the system embodiment only using lateral guiding or using longitudinal and lateral guiding) and then to transfer control to the driver, for example, after the vehicle is braked to a stop and the wheels have been turned toward the pulling-out side. For example, for this purpose a corresponding transfer instruction is output on a display screen in the cockpit, for example, "please take over driving tasks". It can be provided that the driver can take over the guiding of the vehicle by a simple actuation of the accelerator pedal.

Due to the reversing move as the last move of the automated pulling-out process, the vehicle is located farther into the parking space at the transfer position than without reversing move. The driving task is transferred to the driver in a safer position in comparison to a transfer after a forward move. The following traffic is not obstructed by a vehicle located outside the parking space.

Because the reversing move is an essentially linear reversing move, in contrast to a reversing move having steering angle against the direction of the pulling-out side, the vehicle is turned less into the roadway at the end of the reversing move, thus protrudes less out of the parking space, and therefore interferes with the following traffic hardly or not at all.

It would be conceivable that the parking assistance system establishes before the essentially linear reversing move (for example, during the forward move or after the end of the forward move) that a permissible transfer position is reached with the end of a forward move, in which the driver could continuously leave the parking space without collision in a forward move carried out manually while maintaining a distance criterion (i.e., collision-free passing of the front boundary object of the parking space would be possible), and thereupon carries out the essentially linear reversing move to position the vehicle deeper into the parking space again.

However, the parking assistance system is preferably designed to establish, before the essentially linear reversing move carried out automatically, that the vehicle, after the future reversing move carried out automatically, can leave the parking space continuously in a forward move carried out manually by the driver while maintaining a distance criterion (for example, with a distance greater or greater than or equal to a predetermined threshold value to a front boundary object of the parking space). For example, this determination is made during the pulling-out maneuver, for example in a forward move carried out automatically before the essentially linear reversing move carried out automatically or after the end of this forward move. However, this determination can also already have been made in the context of path planning before beginning the pulling-out maneuver. In this case, the determination made before the pulling-out maneuver is preferably verified once again during the pulling-out maneuver, for example, during the forward move preceding the reversing move or immediately after the end of the forward move, using information about the location of the objects in the vehicle surroundings which is then improved.

In the determination, it can be taken into consideration whether the vehicle will be able to leave the parking space using a single manual forward move in consideration of a specific angle of the steered wheels in the direction of the pulling-out side, in particular a full steering lock. Instead of a full steering lock of the steered wheels, a lesser angle of the wheels in relation thereto could also be used as the basis in the determination.

If it has been determined that the vehicle will be able to leave the parking space, after the future reversing move carried out automatically, continuously in a forward move carried out manually by the driver while maintaining a distance criterion and possibly in consideration of a specific steering angle, the essentially linear reversing move is carried out.

In contrast, if it is determined that the vehicle will not be able to leave the parking space, after the essentially linear reversing move carried out automatically, continuously in a forward move carried out manually by the driver while maintaining a distance criterion (and possibly in consideration of a specific steering angle), instead of the essentially linear reversing move, a reversing move having steering angle against the pulling-out side is automatically carried out.

It is preferably also possible to differentiate here between two cases using reversing move having steering angle.

In a first case of the two cases, it is determined that the vehicle will not be able to leave the parking space, after the essentially linear reversing move carried out automatically, continuously in a forward move carried out manually by the driver while maintaining a distance criterion (and possibly in consideration of a specific steering angle), but will be able to leave after a reversing move carried out using a specific steering angle against the pulling-out side in a forward move carried out manually by the driver while maintaining a distance criterion (and possibly in consideration of a specific steering angle). In this first case, the reversing move is carried out having steering angle against the pulling-out side as the last move of the automated pulling-out maneuver and then transferred to the driver.

In the second case, it is determined that the vehicle will not be able to leave the parking space, after the essentially linear reversing move carried out automatically, continuously in a forward move carried out manually by the driver while maintaining a distance criterion (and possibly in consideration of a specific steering angle), and also will not be able to leave after a reversing move carried out using a specific steering angle against the pulling-out side in a forward move carried out manually by the driver while maintaining a distance criterion (and possibly in consideration of a specific steering angle). In this second case, the reversing move having steering angle against the pulling-out side is carried out, but it is not yet the last move of the automated parking maneuver.

It is advantageous if toward the end of the essentially linear reversing move or after ending this reversing move, the wheels are automatically steered in the direction of the pulling-out side, in particular into the full steering lock. The steering of the wheels preferably first takes place at a standstill after ending this reversing move. By steering the wheels in the direction of the pulling-out side, a driving path for safely leaving the parking space is specified to the driver, wherein furthermore the steering effort for the driver is dispensed with.

According to a second aspect of the application, before the transfer of control to the driver (with interference-free sequence having proper ending of the parking maneuver), a reversing move is always carried out automatically as the last move of the automated pulling-out process, for example, as a linear reversing move or as a reversing move having steering angle. Unpredictable exceptional situations can be excluded from this, in which the parking assistance system does not properly end the parking maneuver and in this case does not necessarily carry out a reversing move as the last move, for example, if the parking maneuver is terminated due to an object (for example, pedestrian) in the driving path or due to an impermissible operating action of the driver.

The transfer of control to the driver should thus (with interference-free sequence) always only take place at a travel direction change between reverse and forward. In this way, it is ensured that the vehicle is moved to the rear in the transfer position and thus obstructs the following traffic hardly or not at all. It is not necessary for this purpose for an essentially linear reversing move to be carried out as the last move of the automated pulling-out process.

Thus, if multiple automated moves in the reverse and forward directions are provided, the parking assistance systems should thus plan the transfer so that (with interference-free sequence having proper ending of the parking maneuver), the transfer of control to the driver always takes place after a reversing move as the last move of the automated parking maneuver.

The above statements on the parking assistance system according to the present subject matter according to the first aspect of the application can be transferred to the parking assistance system according to the present subject matter according to the second aspect of the application with the adaptation that instead of an essentially linear reversing move, a reversing move more generally is used.

It is advantageous if the assistance system is designed to determine before the reversing move carried out automatically that the vehicle, after the future reversing move carried out automatically, will be able to leave the parking space continuously in a forward move carried out manually by the driver while maintaining a distance criterion, and to carry out the reversing move automatically in this case.

Alternatively, it would be conceivable that the parking assistance system determines before the reversing move (for example, during the forward move or immediately after the end of a forward move) that a permissible transfer position is reached at the end of a forward move, in which the driver could leave the parking space continuously without collision in a forward move carried out manually while maintaining a distance criterion (i.e., collision-free passing of the front boundary object of the parking space would be possible), and then carries out the reversing move as the last move to position the vehicle deeper into the parking space again.

The first and the second aspect of the application can be combined, i.e., at least in some situations a linear reversing move is carried out as the last pulling-out move, but (with interference-free sequence), at least one reversing move is always carried out as the last pulling-out move. It can also be provided that an essentially linear reversing move is always carried out as the last pulling-out move (with interference-free sequence).

A third aspect of the application relates to a method for automated pulling out using at least automated lateral guiding from a longitudinal parking space, having the following steps: before the transfer of control to the driver, automatically carrying out an essentially linear reversing move as the last move of the automated pulling-out process, and then transferring to the driver.

The above statements on the parking assistance system according to the present subject matter according to the first aspect of the application also apply accordingly to the method according to the present subject matter according to the third aspect of the application.

A fourth aspect of the application relates to a method for automated pulling out using at least automated lateral guiding from a longitudinal parking space, having the following steps: before the transfer of control to the driver, (with interference-free sequence) automatically carrying out an essentially linear reversing move in any case as the last move of the automated pulling-out process, and then, transferring control to the driver.

The above statements on the parking assistance system according to the present subject matter according to the second aspect of the application also apply accordingly to the method according to the present subject matter according to the fourth aspect of the application.

A fifth aspect of the present subject matter relates to software having program code for carrying out the method according to the third and/or fourth aspect of the present subject matter when the software runs on a software-controlled device, for example, on the processor of a motor vehicle controller.

DETAILED DESCRIPTION OF THE DRAWINGS

Figure 1:
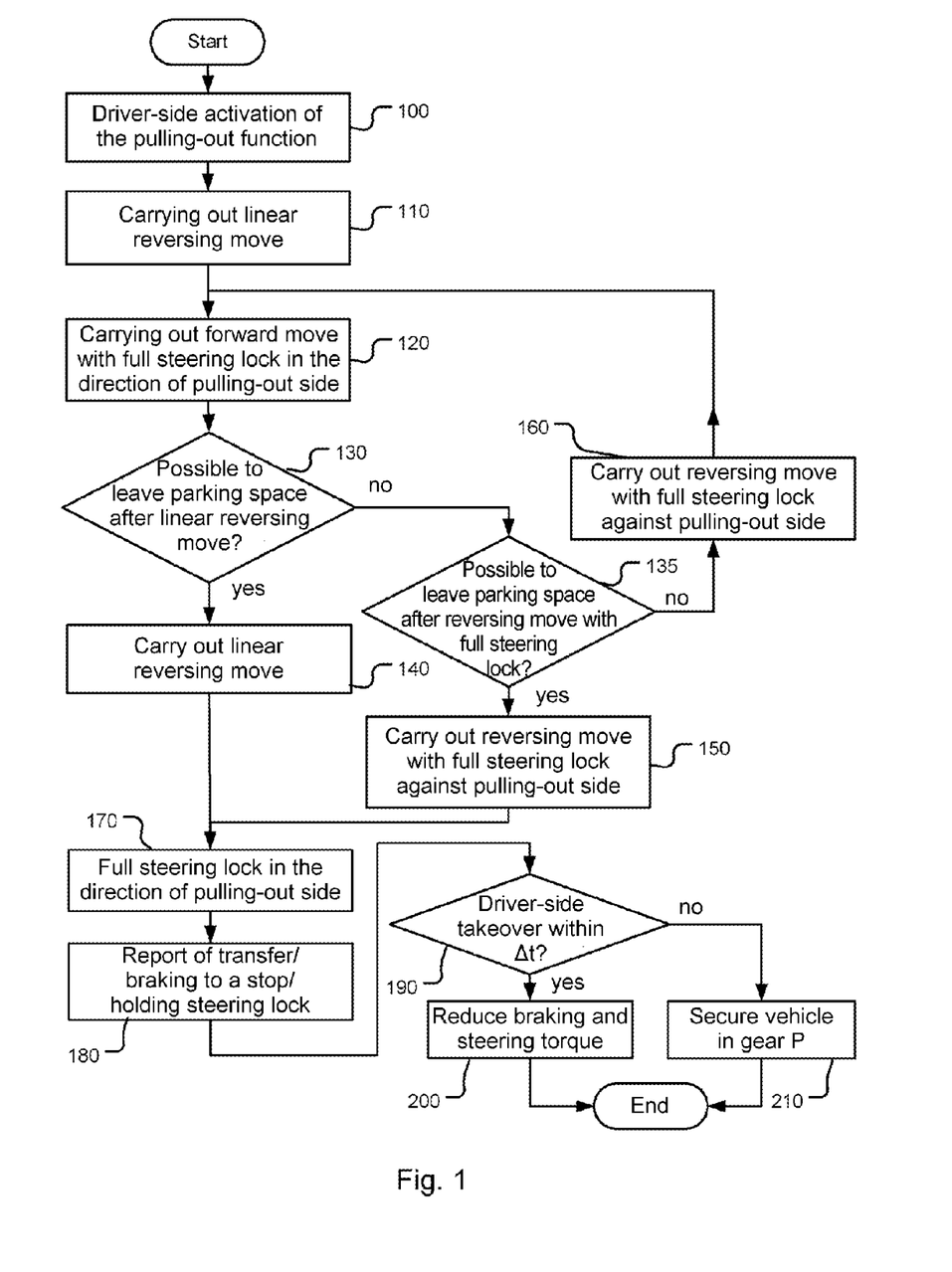
FIG. 1 shows a flow chart of the functionality of an example embodiment of a parking assistance system according to the present subject matter for pulling out.

FIG. 1 schematically shows a simplified flow chart of the functionality of an example embodiment of a parking assistance system according to the present subject matter for pulling out using automated longitudinal and lateral guiding. However, the example embodiment may be transferred to a parking assistance system for pulling out only having automated lateral guiding.

In step 100, the driver activates the pulling-out function, for example, by turning on the ignition, selecting a parking menu on the display screen in the center console by actuating a parking button, selecting the pulling-out side, and releasing the brake pedal.

Figure 2A:
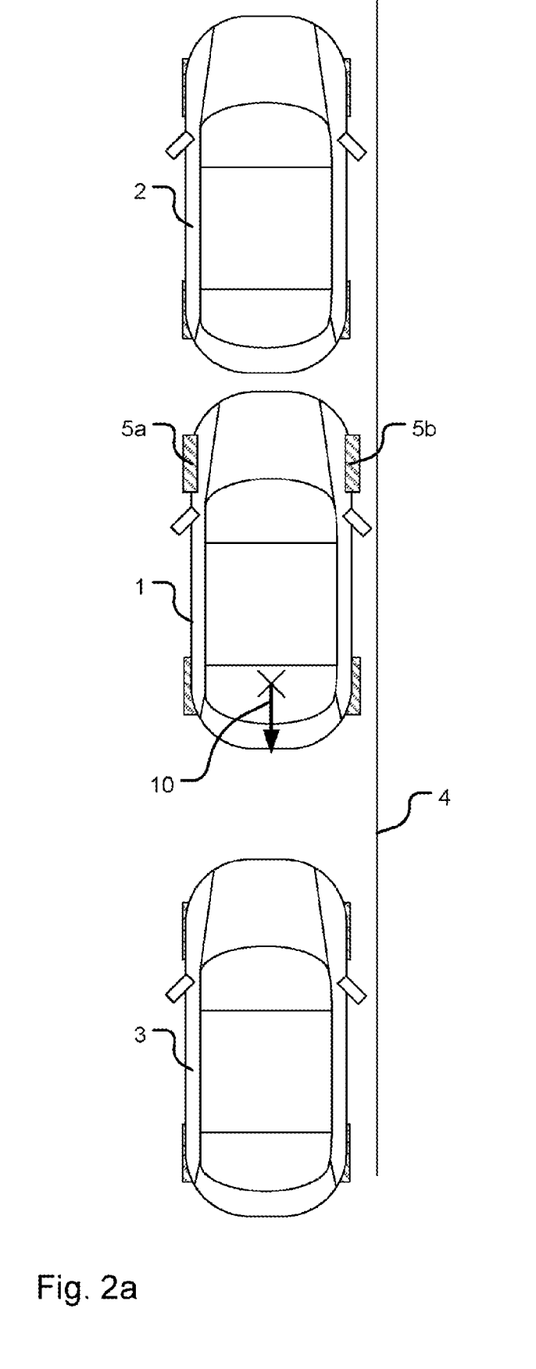
FIGS. 2a-2d show a top view of an example pulling-out situation.

The ego vehicle 1 is located at this point in time in the position shown in FIG. 2a within the longitudinal parking space, which is bounded by the front boundary vehicle 2 and the rear boundary vehicle 3 and laterally by the curbstone 4.

Based on the information about the vehicle surroundings, the parking assistance system calculates a multi-move pulling-out trajectory. While the pulling-out maneuver is carried out, this pulling-out trajectory is adapted based on updated information about the vehicle surroundings.

For simplification, it is presumed in FIG. 1 that the automated parking maneuver begins in step 110 with a linear reversing move 10 in parallel to the curbstone 4, wherein the vehicle is moved back until it reaches or falls below a specific threshold value for the distance to the rear vehicle 3. For this purpose, the reverse gear is engaged by the parking assistance system and the vehicle is accelerated and brought to a standstill in front of the rear vehicle.

Although it is not shown in FIG. 1 for reasons of simplification, it is advantageous if the first move does not necessarily have to be a linear reversing move but rather (in dependence on the distances to the front boundary vehicle 2 and to the rear boundary vehicle 3) instead a steered forward move can be selected as the first move. A steered forward move is reasonable, for example, if there is a very small distance to the rear vehicle 3 before beginning the parking maneuver, while there is a greater distance to the front vehicle 2.

In FIG. 2a, the reversing move 10 is illustrated by the path of a vehicle reference point. In this example, the center of the rear axle is used as the vehicle reference point.

Figure 2B:
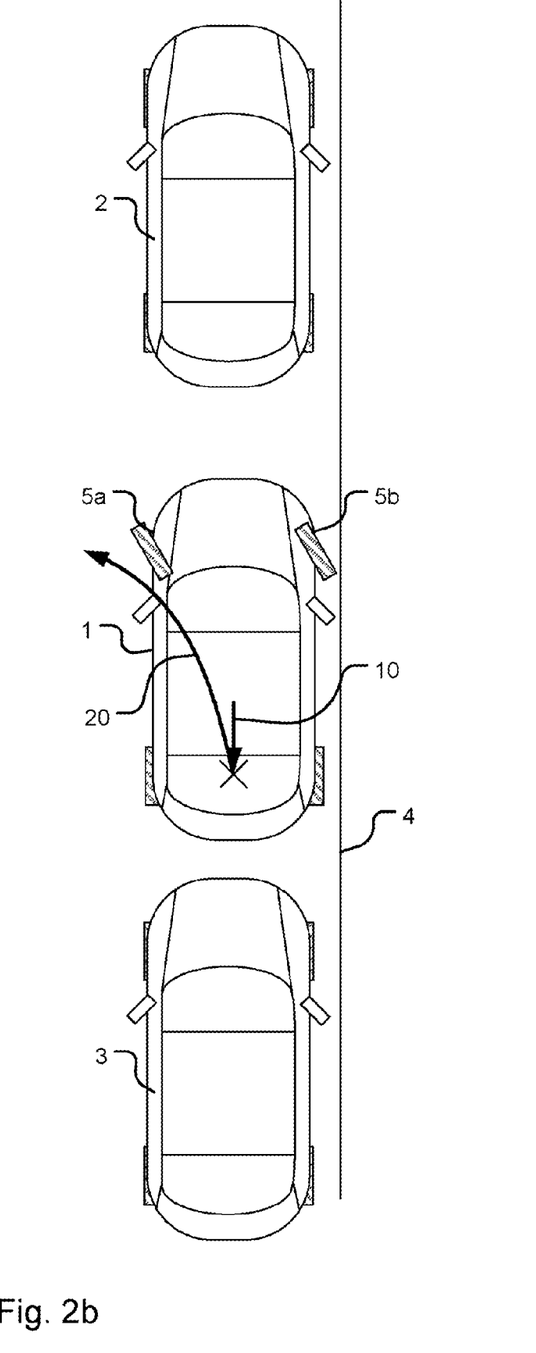

In FIG. 2b, the situation after carrying out the initial reversing move is illustrated.

The steerable wheels 5a, 5b are now—as already shown in FIG. 2b—fully locked in the direction of the pulling-out side and, after automatically switching the travel direction, a forward move 20 described by the path in FIG. 2b is carried out with full steering lock in the direction of the pulling-out side (see step 120).

Figure 2C:
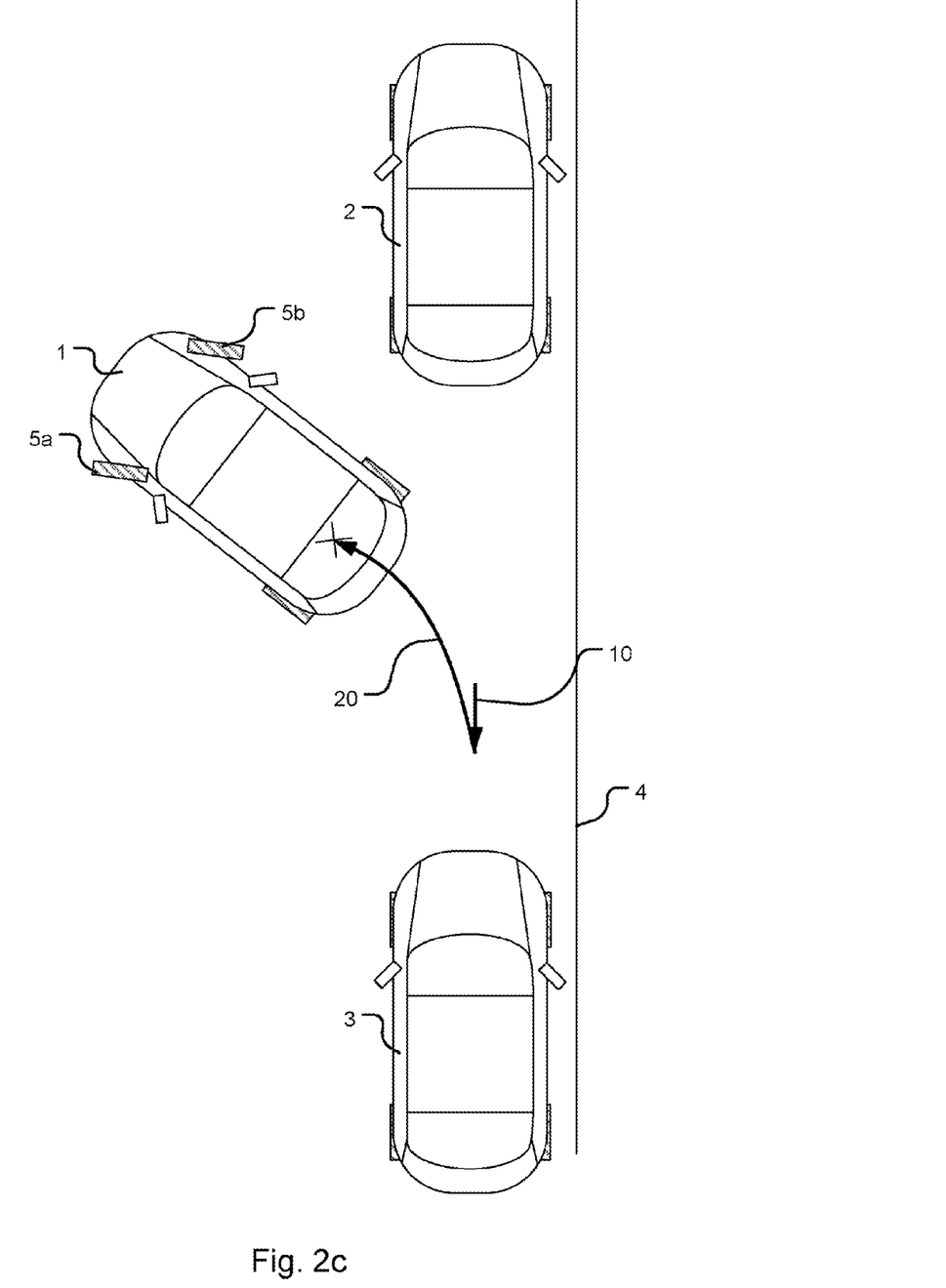

In FIG. 2c, the situation after the end of the forward move 20 is shown.

During the forward move 20 or immediately after the end of the forward move, it is checked in the query 130 whether the vehicle 1 could leave the longitudinal parking space, after a future linear reversing move, by way of a manual forward move following thereon having full steering lock of the wheels 5a, 5b in the direction of the pulling-out side, i.e., whether the vehicle 1, after a (future) linear reversing move and a full steering lock of the wheels 5a, 5b following thereon, could pass the front vehicle 2 while maintaining a specified safety distance in a forward move carried out manually on the part of the driver. The check thus takes place before the linear reversing move that is possibly carried out.

Figure 2D:
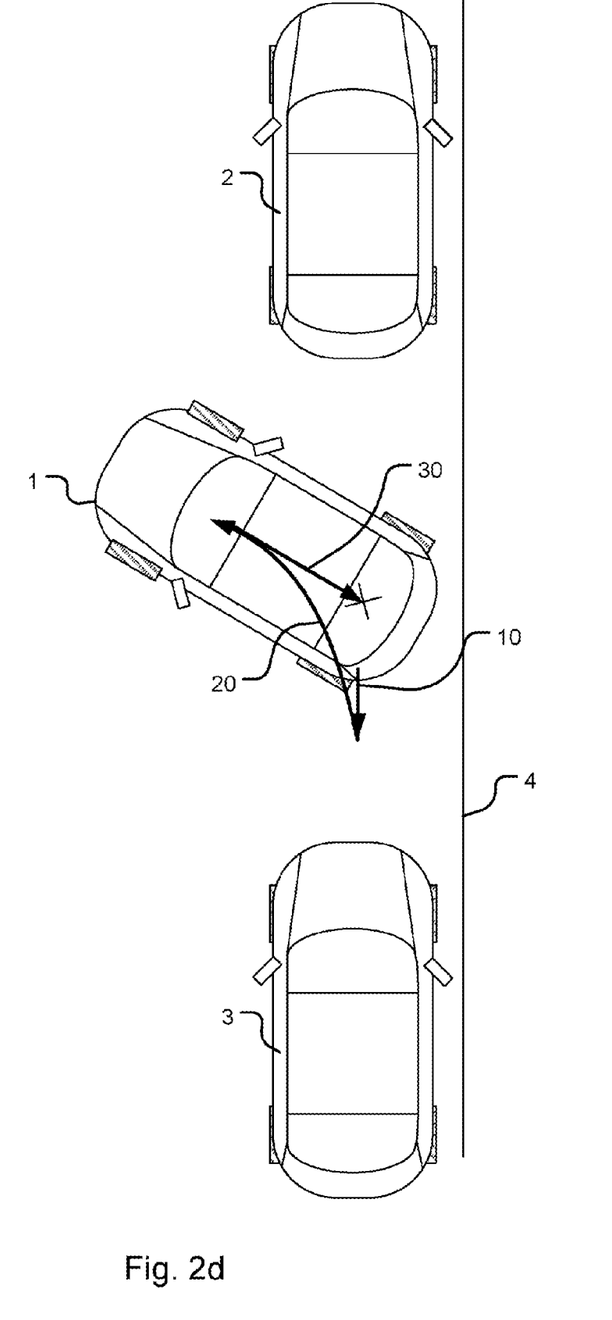
Figure 3:
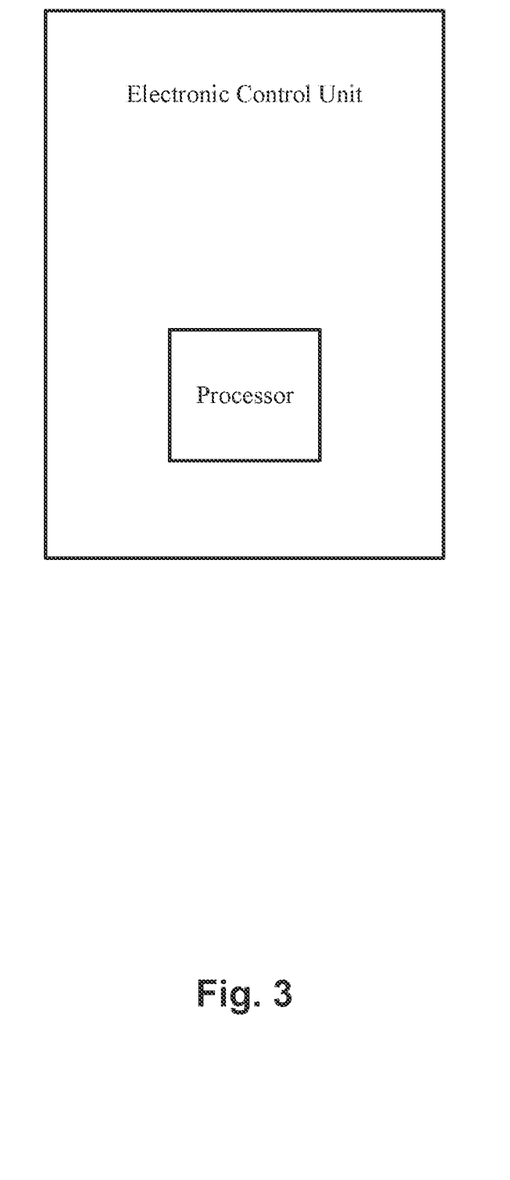
FIG. 3 shows an electronic control unit including a processor.

If this is the case, after switching the travel direction and straightening out the wheels 5a, 5b, the linear reversing move 30 shown in FIG. 2b is carried out on the part of the parking assistance system (see step 140). In FIG. 2d, the vehicle is shown already in the position after the end of the linear reversing move. During the linear reversing move, the vehicle is moved back until, for example, it reaches or falls below a predetermined threshold value for the distance to the curbstone 4.

If the result of the check in step 130 is negative, a reversing move is carried out with full steering lock against the direction of the pulling-out side (see step 150 or alternatively step 160). Two cases are distinguished here, as will be explained in the following discussion.

If it is determined in a check according to step 135 that the parking space could be left, after a future reversing move with full steering lock against the direction of the pulling-out side, in a manual forward move with full steering lock in the direction of the pulling-out side, the reversing move is carried out with full steering lock (see step 150); in this case, this move is the last move of the automated driving maneuver.

In contrast, if the check according to step 135 has a negative result, after the reversing move having full steering lock is then carried out (see step 160), a further forward move (see step 120) is necessary, which is always followed by a reversing move in the sequence of FIG. 1.

After ending the linear reversing move according to step 140 or the reversing move according to 150, the wheels are steered into the full steering lock in the direction of the pulling-out side (see step 170), and then the vehicle 1 is transferred to the driver.

For this purpose, in step 180 a report about the successful ending of the automated parking maneuver is overlaid on the display screen in the cockpit and the vehicle is actively braked to a stop by the parking assistance system so that the vehicle does not roll away. At the same time, the steering is held in the full steering lock to prevent opening/relaxation of the steering. In this state, the driver can take over the guiding of the vehicle with a simple actuation of the accelerator pedal. If it is determined in step 190 that the driver wishes to take over the guiding of the vehicle 1 by actuating the accelerator pedal, the actuation of the accelerator pedal has the result that the braking torque is slowly reduced in order to ensure comfortable starting behavior (see step 200). Furthermore, the steering torque is also reduced in step 200. If the driver does not take over the guiding of the vehicle 1 by actuating the accelerator pedal within the period Δt (for example, Δt=5 seconds), the vehicle is secured by engaging the gear P (see step 210) and the function is ended.

In the functionality shown in FIG. 1, a reversing move is always carried out as the last pulling-out move, either as a linear reversing move (see step 140) or as a steered reversing move (see step 135).

It would be conceivable to dispense with the query 135 and, in the event of a negative check result of the query 130, to carry out the reversing move with full steering lock according to step 160. In this case, the last move of the automated pulling out maneuver would always be a linear reversing move (step 150 would be omitted).

What is claimed is:

1. A parking assistance system for a motor vehicle for automated pulling-out using at least automated lateral guiding out of a longitudinal parking space, comprising:
   an electronic control unit comprising a processor to execute one or more software programs configured to cause the electronic control unit to:
   control the vehicle to perform a plurality of pulling-out moves of an automated pulling-out process, wherein the plurality of pulling-out moves comprises an automatic forward move,
   before transferring control of the vehicle to a driver, control the vehicle to automatically perform a linear reversing move towards the longitudinal parking space, wherein the linear reversing move is carried out immediately following the automatic forward move as the last move of the automated pulling-out process based on a determination, made during or immediately after the forward move and prior to the linear reversing move, that the vehicle will, subsequent to the linear reversing move, be able to leave the parking space continuously in a manual forward move carried out by the driver while maintaining a distance criterion, and transfer control of the vehicle to the driver.

2. The parking assistance system according to claim 1, wherein the one or more software programs are further configured to cause the electronic control unit to:

determine, during the automatic forward move carried out automatically before the automatic linear reversing move, that the vehicle will subsequently be able to leave the parking space continuously in the forward move carried out manually by the driver while maintaining a distance criterion.

3. The parking assistance system according to claim 1, wherein the one or more software programs are further configured to cause the electronic control unit to:

determine, before the linear reversing move is carried out automatically, that the vehicle will subsequently be able to leave the parking space continuously in the forward move carried out manually by the driver while maintaining the distance criterion and with a full steering lock in the direction of the pulling-out side.

4. The parking assistance system according to claim 1, wherein the one or more software programs are further configured to cause the electronic control unit to:

determine, after the linear reversing move is carried out automatically, that the vehicle will not be able to leave the parking space continuously in a forward move carried out manually by the driver while maintaining a distance criterion; and based on the determination, carry out a second reversing move automatically having a specific steering angle against the pulling-out side instead of carrying out the linear reversing move a second time.

5. The parking assistance system according to claim 4, wherein the one or more software programs are further configured to cause the electronic control unit to:

determine, after the linear reversing move is carried out automatically, that the vehicle will not be able to leave the parking space continuously in the forward move carried out manually by the driver while maintaining the distance criterion; and determine, after the second reversing move carried out using the specific steering angle against the pulling-out side, that the vehicle will be able to leave in the forward move carried out manually by the driver while maintaining the distance criterion, and wherein the last move of the automated pulling-out process further comprises:

the second reversing move having the specific steering angle against the pulling-out side as the last move of the automated pulling-out process automatically; and the transfer of the control of the vehicle to the driver.

6. The parking assistance system according to claim 1, wherein the one or more software programs are further configured to cause the electronic control unit to:

steer, while the vehicle is at a standstill, in the direction of the pulling-out side with full steering lock upon completion of a second reversing move having a specific steering angle against the pulling-out side.

7. The parking assistance system according to claim 1, wherein the parking assistance system is a parking assistance system for automated pulling out using automated lateral and longitudinal guiding.

8. The parking assistance system according to claim 1, wherein the one or more software programs are further configured to cause the electronic control unit to:

before the transfer of control to the driver, to always carry out the linear reversing move or a second reversing move automatically as the last move of the automated pulling-out process, and then to transfer control to the driver.

9. The parking assistance system according to claim 1, wherein the one or more software programs are further configured to cause the electronic control unit to:

determine, before the linear reversing move is carried out automatically, that upon completion of a forward move carried out automatically, the vehicle can leave the parking space continuously in a forward move carried out manually by the driver while maintaining a distance criterion; and carry out the linear reversing move automatically based on the determination.

10. A parking assistance system for a motor vehicle for automated pulling-out using at least automated lateral guiding out of a longitudinal parking space, comprising:

an electronic control unit comprising a processor to execute one or more software programs configured to cause the electronic control unit to:

control the vehicle to perform a plurality of pulling-out moves of an automated pulling-out process, wherein the plurality of pulling-out moves comprises an automatic forward move, before transferring control of the vehicle to a driver, control the vehicle to always automatically carry out a linear reversing move towards the longitudinal parking space, wherein the linear reversing move is carried out immediately following the automatic forward move as the last move of the automated pulling-out process to position the vehicle deeper into the longitudinal parking space, based on a determination, made during or immediately after the forward move and prior to the linear reversing move, that the vehicle will, subsequent to the linear reversing move, be able to leave the parking space continuously in a manual forward move carried out by the driver while maintaining a distance criterion, and transfer control of the vehicle to the driver.

11. A method for automated pulling out using at least automated lateral guiding out of a longitudinal parking space via a motor vehicle, comprising:

performing a plurality of pulling-out moves of an automated pulling-out process, wherein the plurality of pulling-out moves comprises an automatic forward move;

before transferring control of the vehicle to a driver, controlling the vehicle to automatically perform a linear reversing move towards the longitudinal parking space, wherein the linear reversing move is carried out immediately following the automatic forward move as the last move of the automated pulling-out process, based on a determination, made during or immediately after the forward move and prior to the linear reversing move, that the vehicle will, subsequent to the linear reversing move, be able to leave the parking space continuously in a manual forward move carried out by the driver while maintaining a distance criterion; and transferring control of the vehicle to the driver.

12. The method according to claim 11, wherein the vehicle is controlled to automatically perform the linear reversing move as the last move of the automated pulling-out process in each case before transferring control of the vehicle to the driver.

13. The parking assistance system according to claim 1, wherein the last move of the automated pulling-out process positions the vehicle deeper into the longitudinal parking space.

14. The method according to claim 11, wherein the last move of the automated pulling-out process positions the vehicle deeper into the longitudinal parking space.

15. The parking assistance system according to claim 1, wherein the one or more software programs are further configured to cause the electronic control unit to:
   determine, upon completion of the forward move carried out automatically, that the vehicle will subsequently be able to leave the parking space continuously in the forward move carried out manually by the driver while maintaining a distance criterion.

16. The parking assistance system according to claim 1, wherein the one or more software programs are further configured to cause the electronic control unit to:
   during the linear reversing move, moving the vehicle rearward until reaching or falling below a predetermined threshold distance to a curb.

* * * * *